W. B. FASSBINDER.
AUTOMOBILE HEADLIGHT.
APPLICATION FILED DEC. 15, 1917.

1,293,065.

Patented Feb. 4, 1919.

INVENTOR
Werner B. Fassbinder.

WITNESSES

BY

ATTORNEY

UNITED STATES PATENT OFFICE.

WERNER B. FASSBINDER, OF GUTTENBERG, IOWA.

AUTOMOBILE-HEADLIGHT.

1,293,065.
Specification of Letters Patent.
Patented Feb. 4, 1919.

Application filed December 15, 1917. Serial No. 207,297.

*To all whom it may concern:*

Be it known that I, WERNER B. FASSBINDER, a citizen of the United States, residing at Guttenberg, in the county of Clayton and State of Iowa, have invented certain new and useful Improvements in Automobile-Headlights, of which the following is a specification.

This invention relates to an improved headlight for use in connection with an automobile and the principal object of the invention is to provide an improved mounting for a headlight so that the headlight may be used as a spotlight thus acting as a headlight and also taking the place of a spotlight which is used in connection with the windshield of an automobile.

Another object of the invention is to so mount this headlight that it may be swung in the arc of a circle while the second headlight remains stationary.

Another object of the invention is to so mount this headlight and actuating means for the headlight that it will be normally positioned to direct the light ahead of the car, the actuating means including a foot treadle by means of which the headlight may be turned to one side of the road.

Another object of the invention is to so construct the actuating means that when pressure upon the foot treadle is removed, the headlight will return to the normal position.

Another object of the invention is to so construct this improved headlight that it may be applied to cars already in use thus permitting the headlight to be sold as a separate article and applied to cars already in use or permitting it to be applied to cars when first built.

This invention is illustrated in the accompanying drawings, wherein:—

Figure 1:
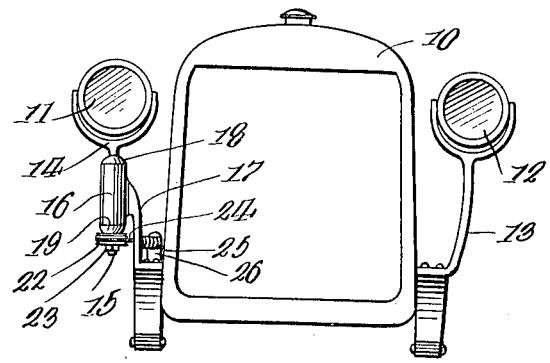
Figure 2:
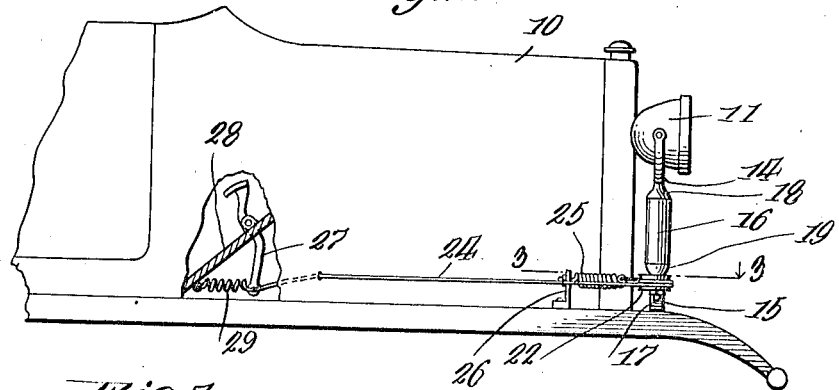
Figure 4:
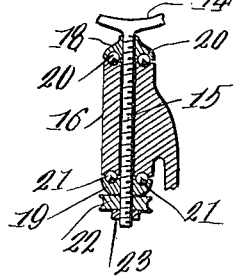
Figure 3:
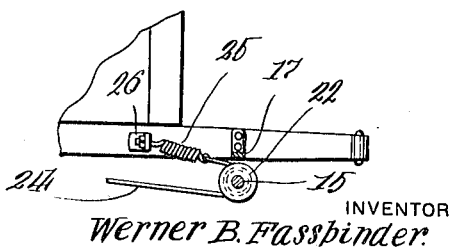

Figure 1 is a view in front elevation showing the improved headlight applied to a car, Fig. 2 is a side elevation showing the improved headlight applied to a car, Fig. 3 is a fragmentary sectional view taken along the line 3—3 of Fig. 2, and Fig. 4 is a vertical sectional view showing the manner of rotatably mounting the headlights in the brackets.

The automobile indicated in general by the numeral 10 will be provided with the two headlights 11 and 12, the headlight 12 having its bracket 13 rigidly mounted thus providing a stationary headlight. The fork or standard 14 of the headlight 11 has its threaded stem 15 extending through the bearing 16 of the bracket 17. This stem 15 carries upper and lower cups 18 and 19 which cups are positioned above and below the bearing sleeve 16 and engage the anti-friction balls 20 and 21 thus permitting this headlight 11 to turn easily. A pulley wheel 22 is positioned upon the threaded stem beneath the bearing cup 19 and held in place by the securing nut 23 thus causing the lamp 11 to be swung in the arc of a circle when the pulley wheel 22 is rotated through the medium of the line 24. This line 24 passes about the pulley wheel and has one end connected with the spring 25 connected with the bracket 26 and has its opposite end portion extended along the automobile as shown in Fig. 2 and connected with the foot treadle 27. This foot treadle is pivotally mounted in the dashboard 28 of the automobile and is engaged by the springs 29. The springs 25 and 29 serve to yieldably hold the actuating mechanism in the position shown in Fig. 2 with the foot treadle at neutral and the headlight 11 positioned at neutral to direct its ray of light directly ahead of the car. When it is desired to swing the headlight as a spotlight to one side or the other of the road, it is simply necessary to place the foot upon the treadle and move the treadle to either draw upon the line and turn the headlight against the action of the spring 25 or else move the treadle to release the line and permit the spring 25 to draw the line to turn the headlight. When pressure upon the treadle is removed, the springs 25 and 29 will serve to return the actuating mechanism and lamp to the neutral position.

It will thus be seen that when moving along a dark road, the headlight 12 may throw the light directly in front of the machine, this light being so pitched that it will not shine in the eyes of a driver approaching. The headlight 11 will throw its light far ahead of the car and thus the road will be lighted close to the car and at a distance from the car. If a machine is approaching, the headlight 11 can be swung to one side thus preventing the light from shining in the eyes of an approaching driver. If it is desired to inspect the road to one side of the machine, or if it is desired to follow the curve of a road when making a turn, the headlight or spotlight 11 can be turned in the desired direction. This headlight or spotlight has been shown positioned on the right-hand side of the automobile but it is to be understood that this simply illustrates one application of the invention and that either right-hand or the left-hand light could be mounted to rotate. Of course if the left-hand light were mounted to rotate, the right-hand light would be stationary.

What is claimed is:—

The combination with an automobile chassis; of an upright bearing, a lamp bracket having a lamp with a threaded stem mounted to rotate in said bearing and projecting through its lower end, a pulley secured to said projecting end, a cable passing around said pulley, a coiled spring connecting one end of said cable to said chassis, a lever fulcrumed intermediately of its ends with its lower end secured to the other end of said cable, and a coiled spring connecting said lever end to the chassis at the rear of and in alinement with the cable, one spring operating to turn said stem in one direction when the cable is slackened and to return it to normal when the cable has been pulled to turn the lamp in the other direction, the interaction of said springs operating to hold the lamp in neutral.

In testimony whereof I affix my signature in presence of two witnesses.

WERNER B. FASSBINDER.

Witnesses:
FRANK C. SAEUGLING,
HENRY F. SCHIERHOF.